United States Patent
Leemet et al.

(10) Patent No.: US 10,243,973 B2
(45) Date of Patent: Mar. 26, 2019

(54) CLOUD OPTIMIZER

(71) Applicants: Jaan Leemet, Austin, TX (US); Paul Schmidt, Rocky Hill, CT (US)

(72) Inventors: Jaan Leemet, Austin, TX (US); Paul Schmidt, Rocky Hill, CT (US)

(73) Assignee: Tangoe US, Inc., Shelton, CT (US)

( * ) Notice: Subject to any disclaimer, the term of this patent is extended or adjusted under 35 U.S.C. 154(b) by 142 days.

(21) Appl. No.: 15/130,496

(22) Filed: Apr. 15, 2016

(65) Prior Publication Data

US 2017/0302550 A1    Oct. 19, 2017

(51) Int. Cl.
*H04L 29/06* (2006.01)
*H04L 12/24* (2006.01)

(52) U.S. Cl.
CPC ...... *H04L 63/1416* (2013.01); *H04L 41/0896* (2013.01); *H04L 63/1425* (2013.01); *H04L 41/5051* (2013.01); *H04L 63/1458* (2013.01)

(58) Field of Classification Search
CPC ............... H04L 63/1416; H04L 43/065; H04L 43/0876; H04L 43/16; H04L 63/1425; H04L 63/1458; H04L 41/0896; H04L 41/5051
See application file for complete search history.

(56) References Cited

U.S. PATENT DOCUMENTS

| | | | |
|---|---|---|---|
| 8,065,206 B2 | 11/2011 | Thomas | |
| 8,473,376 B2 | 6/2013 | Hartley et al. | |
| 9,092,508 B1 * | 7/2015 | Canty | G06F 11/3062 |
| 9,794,281 B1 * | 10/2017 | Radlein | H04L 63/1441 |
| 2002/0166117 A1 | 11/2002 | Abrams et al. | |
| 2004/0117224 A1 | 6/2004 | Agarwal et al. | |
| 2005/0010502 A1 | 1/2005 | Birkestrand et al. | |
| 2006/0218059 A1 | 9/2006 | Hartley et al. | |
| 2008/0281736 A1 | 11/2008 | Thomas | |
| 2011/0093413 A1 * | 4/2011 | Calcaterra | G06F 11/3409 706/11 |
| 2012/0016721 A1 | 1/2012 | Weinman | |
| 2012/0131161 A1 | 5/2012 | Ferris et al. | |

(Continued)

FOREIGN PATENT DOCUMENTS

| | | |
|---|---|---|
| CA | 2598180 A1 | 9/2006 |
| EP | 1861819 A2 | 12/2007 |
| WO | 2006101591 A2 | 9/2006 |

OTHER PUBLICATIONS

"How AWS Pricing Works", Amazon Web Sevices, Jul. 2014, 15 pages.

*Primary Examiner* — Joseph P Hirl
*Assistant Examiner* — Chi D Nguy
(74) *Attorney, Agent, or Firm* — St. Onge Steward Johnston & Reens, LLC

(57) ABSTRACT

A system that communicates with one or more host providers to monitor a computing load on the computing resources of the host providers and then compares this computing load or usage with expected threshold values to determine if notifications should be generated to alert administrators or the host provider of unexpected usage. The system also provides dynamic adjustment of the thresholds based on increased usage that is desired such as a large number of unique users accessing the software application to use the software application in a way that generates revenue or the potential for revenue for the software application provider.

20 Claims, 6 Drawing Sheets

(56) References Cited

U.S. PATENT DOCUMENTS

| | | | |
|---|---|---|---|
| 2014/0006609 A1 | 1/2014 | Gay et al. | |
| 2014/0047437 A1* | 2/2014 | Wu | G06F 11/3442 |
| | | | 718/1 |
| 2014/0278807 A1 | 9/2014 | Bohacek | |
| 2015/0127804 A1* | 5/2015 | Kripalani | H04L 43/10 |
| | | | 709/224 |
| 2015/0288592 A1* | 10/2015 | Baughman | H04L 43/16 |
| | | | 709/224 |
| 2016/0212064 A1 | 7/2016 | Biswas et al. | |
| 2016/0321115 A1 | 11/2016 | Thorpe et al. | |

\* cited by examiner

CLOUD OPTIMIZER

FIELD OF THE INVENTION

The invention relates to cloud computing. More specifically, the invention relates to a system and method for managing computing power and resources used by hosted software applications on cloud platforms and servers and Infrastructure as a Service (IaaS) platforms.

BACKGROUND OF THE INVENTION

Many companies use network accessible software, to provide online shopping tools, mobile apps and other software that is stored and executes on a server or computer that is remote to the actual user. In some cases, access is via a web browser on a user computer, in some a dedicated local client such as local software or an application that executes on a mobile phone provides access or the portal for access. In the mobile scenario, the mobile application may perform some functions whereas the remote software may perform others. In certain cases, software routines are distributed between multiple locations and servers or devices. Some of these applications are considered Software as a Service (SaaS). Others are simply web based programs.

These software programs provide many advantages over locally installed software. Updates to the software and product offerings can often be accomplished without requiring that the end users install updates or physically use a fresh installation disk or even download a fresh copy of the software. This allows companies to easily change functionality, color schemes, and provide software updates, bug fixes, security enhancements and other benefits in a way that in many cases immediately results in all users having access to the most up-to date software.

This in turn allows customer/technical support to provide support for a single version of the software/application or at least a single version within each operation system environment, ie. Windows, Mac, iOS, Android etc.

Many of the software programs discussed above use a number of servers, storages and other types of computing resources to operate. This has led to hosted services providers to focus on the business of renting server space and computing power so that the actual owner of the application does not need to maintain a collection of servers and storages for each of their applications. These services are sometimes referred to in the industry as Platform-as-a-Service (PaaS) or Infrastructure-as-a-Service (IaaS). In this case, the host provider will allow the software application owner to install their software on its servers and will charge based on computing power/resources reserved or used by the software. The billing models of these hosts are often very complicated and difficult for developers and product designers to understand.

These pricing models are also changing as providers compete to offer advantageous pricing. Application's needs may also vary depending on customer profile, or even as applications evolve and scale past their initial configurations which may have been suitable at the onset, but may no longer be the ultimate fit over time.

As but one example Amazon AWS offers server usage on demand and adjusts the amount of computing power available to a particular application based on the amount of usage thereof. As usage increases, the bill for the hosted services increases. In some cases, the increased usage is simply due to more users interacting with the application(s). In other cases, the increased usage is un-necessarily increased due to re-designs of the software and certain features thereof.

Because developers and product designers are often updating software applications on a regular basis, the computing load that is used up by the software may change. For example, added features may require more processing power, more bandwidth, a faster storage (lower access time) or other computing power metric in order to operate efficiently and effectively. This may lead to more resources being reserved for the software application and therefore added expense, but it is difficult to accurately quantify what software changes cause which processing power requirements to change. In another example, an application which was initially about ¾ reporting and ½ processing may evolve over time to have ¾ reporting as these are added and enhanced. The profile initially thought of to deliver the application may no longer be the most suitable.

As but one example, a developer may decide to update a software program to check the time or date every minute whereas previous versions checked every hour. Although this change does not individually amount to much change on a minute by minute basis, the amount of network bandwidth used to ping a remote server to check the time is now 60 times larger. This added bandwidth may be un-necessary in some cases where it is not crucial to check time on such a regular basis. In other scenarios, for example a sporting event timing system, checking time may be crucial for accuracy and precision. When the software update includes updates and changes to many features, it can be difficult to tell what sections of new code or the interaction with other parts of the software cause a higher requirement of bandwidth. It is even more difficult to correlate these changes to a cost structure to determine whether the updates are worth the added cost. The difficulty with current systems is that it is not possible to have a good understanding of how updates, changes or new versions impact computing resource/power and network bandwidth usage.

As another example, sometimes users increase substantially over a short period of time. In some cases, this is due to widespread publicity that drives users to particular websites, mobile apps etc.

As yet another example, the increase in usage could be due to a malicious attack on the software application, for example a Denial of Service (DOS), Distributed Denial of Service (DDOS) or Address Resolution Protocol storm (ARP Storm). These attacks are un-wanted from a security standpoint but they also substantially increase computing resource/power and bandwidth usage leading to more costs.

In yet another example it is increasingly popular to use the hosting providers for short computing problems. The infrastructure setup has become so efficient that it is possible to spin up instances of computing resources in minutes or even seconds and pay for these by the minute or hour. In some cases, rather than having a machine sitting idle (and vulnerable to attacks for example) it is desirable to simply spin up an instance on demand. This computing on demand may be triggered by an IT person that wants to do a test on a new piece of software where the IT person provisions a server/instance for this test. It can also be a production software program which spins up an instance at the end of the month when there are many calculations to perform. In other cases the demand may be an instance that is spun up when an end user presses requests to run a report that requires additional computing power and the underlying system/software spins up a server to service the request.

In some of the scenarios above, the computing resources are again dynamically created and vary month to month depending on end user actions and activity. Someone that is paying for a usage based service may be surprised by the amount of usage at the end of the month.

Further, since the services are spun up on demand, it is difficult for traditional tools that look and sniff out active servers to recognize and detect these transitory services and machines. Again leading to possible bill shock.

Finally, some providers allow for spot bidding or auctions on these on-demand spinning up of resources.

Creative hackers with system knowledge may also maliciously try to fire off these expensive requests in an attempt to drive up service costs or give denial of service attempts at an enterprise with such elements.

It is therefore desirable to provide a system that enables management of hosted software by allowing transparency in understanding how changes, updates, changes in user profile, revisions or even new implementations result in increased computing resource/power usage and therefore added expense. It is still further desirable to notify expense managers or billing departments how expenses relating to hosted software may be impacted due to these changes, updates, revisions and new implementations. It is further desirable to provide a system that enables software application owners to have better insight into when there are substantial user increases and if any of those increases relate to malicious attacks such as DOS, DDOS and ARP Storms. It is yet further desirable to notify security teams/developers and/or expense/billing departments to when increased usership is occurring and if such increase is due to a malicious attack so that appropriate action can be taken. It is yet further beneficial for system administrators to map the available billing models over the available service providers to find the optimal service provider both for the immediate needs and the applications needs as they evolve over changing conditions.

SUMMARY OF THE INVENTION

One object of the invention is to provide a system that can monitor hosted computing resource usage and alert administrators of unexpected or abnormal usage.

Another object of the invention is to deactivate or restrict usage of hosted computing resources in the event of a security threat.

Yet another object of the invention is to monitor existing host providers to determine when new resources are activated or when activated resources are not being used adequately.

Still another object of the invention is to detect activation or spin up of instances/servers on a temporary or more permanent basis by continually monitoring for the introductions of new machines to the network and use the billing models to calculate approximate costs. This leads to a system which would allow alerts to be raised if machines were fired up and left up, fired up maliciously or other cases that would result in an unexpected increase in usage and therefore costs so that a threshold based notification can be issued.

These and other objects are achieved by providing a system that communicates with one or more host providers to monitor a computing load on the computing resources of the host providers and then compares this computing load or usage with expected threshold values to determine if notifications should be generated to alert administrators or the host provider of unexpected usage. The system also provides dynamic adjustment of the thresholds based on increased usage that is desired, for example, a large number of unique users accessing the software application to use the software application in a way that generates revenue for the software application provider.

The following definitions apply shall apply. A "unique user" as used herein means a single individual, computer or application that establishes a communication with another computer, application, server, host provider, storage or other computing resource.

The term "data" as used herein means any indicia, signals, marks, symbols, domains, symbol sets, representations, and any other physical form or forms representing information, whether permanent or temporary, whether visible, audible, acoustic, electric, magnetic, electromagnetic or otherwise manifested. The term "data" as used to represent predetermined information in one physical form shall be deemed to encompass any and all representations of the same predetermined information in a different physical form or forms.

The term "network" as used herein includes both networks and internetworks of all kinds, including the Internet, and is not limited to any particular network or inter-network.

The terms "first" and "second" are used to distinguish one element, set, data, object or thing from another, and are not used to designate relative position or arrangement in time.

The terms "coupled", "coupled to", "coupled with", "connected", "connected to", and "connected with" as used herein each mean a relationship between or among two or more devices, apparatus, files, programs, media, components, networks, systems, subsystems, and/or means, constituting any one or more of (a) a connection, whether direct or through one or more other devices, apparatus, files, programs, media, components, networks, systems, subsystems, or means, (b) a communications relationship, whether direct or through one or more other devices, apparatus, files, programs, media, components, networks, systems, subsystems, or means, and/or (c) a functional relationship in which the operation of any one or more devices, apparatus, files, programs, media, components, networks, systems, subsystems, or means depends, in whole or in part, on the operation of any one or more others thereof.

In one aspect the a system is provided for managing computing resources associated with a first hosting provider by monitoring changes in computing resource usage. The system includes a software application executing on a first set of computing resources, the first set of computing resources includes at least one computing resource. The software application is accessible via a network by a user device and is associated with a first metric indicative of a computing load on the first set of computing resources due to the software application executing thereon. A system computer is in communication with the software application. An analysis module associated with the system computer and detects association of the software application with a second set of computing resources, the second set of computing resources indicative of those of the plurality of computing resources that the software application executes on. A threshold module is in communication with the analysis module and associates a threshold with the software application and further determines if the threshold has been reached based on a second metric. The second metric is indicative of a computing load on the second set of computing resources due to the software application executing thereon. A notification module is in communication with the threshold module and generates a notification indicative of the threshold having been reached.

In some aspects the threshold is reached based on an amount of change between the first and second metrics. The second set of computing resources may include the first set of computing resources. The second set of computing resources may include fewer computing resources than the first set of computing resources. The association may be due to an updated version of the software application being associated with the second set of computing resources. The threshold may be adjusted based on how many unique users of the plurality of users access the software application. The threshold may also be adjusted based on how many unique Internet Protocol (IP) addresses are associated with access to the software application.

The threshold may also be adjusted based on how many unique requests are associated with access to the software application.

The second set of computing resources may be the same as the first set of computing resources.

In other aspects, a system is provided for monitoring a plurality of computing resources associated with a first hosting provider. A system computer is in communication with the plurality of computing resources. A software application executes on the plurality of computing resources and has at least a first metric associated therewith. The first metric is indicative of a computing load placed on plurality of computing resources due to the software application executing thereon. An analysis module associated with the system computer determines at least a second metric indicative of a computing load associated with a second software application wherein the second software application is a updated version of the software application. A threshold module is in communication with the analysis module and determines a cost associated with the second software application based on a billing model associated with the first hosting provider and the at least a second metric to determine if at least one threshold has been reached. A notification module is in communication with the analysis module and generates a notification based on the at least one threshold.

The change may be due to an additional one of the plurality of computing resources being associated with the software application. The notification may also be indicative of a one or more functions or segments of code of the second software application that cause the threshold to be reached earlier in comparison to the first software application.

In other aspects a system for managing a plurality of computing resources associated with a first hosting provider includes a software application executing on a first set of computing resources including at least one of said plurality of computing resources. The software application is accessible by a plurality of users via a network by user devices. A system computer is in communication with the first set of computing resources. An analysis module is associated with the system computer and determines at least a first metric indicative of a computing load on the first set of computing resources due to the software application executing on the first set of computing resources. A threshold module is in communication with the analysis module and determines when at least one threshold associated with the first set of computing resources has been reached based on a cost record associated with the first hosting provider. The cost record is indicative of a cost of hosting the software application based at least in part on the first metric.

The threshold module may determine that the at least one threshold has been reached based on a change in the at least one metric. A notification module may generate a notification based on the threshold having been reached. The threshold may be reached when the first metric is indicative of a computing load that can be handled by fewer of the plurality of computing resources than those computing resources in the first set of computing resources. The cost record may be associated with a billing model of the hosting provider and may vary from one provider to another.

In other aspects a system is provided for managing server usage. A software application executes on at least one of a plurality of computing resources associated with a first hosting provider. The software application is accessible via a network by a user device. A computer is in communication with the at least one of the plurality of computing resources. A storage is in communication with the computer and contains a data record indicative of a cost associated with usage of the at least one of the plurality of computing resources. An analysis module is associated with the computer and determines a data metric associated with the at least one of the plurality of computing resources. The data metric is indicative of an amount of computing power associated with the software application. A threshold module associated with the computer and determines when at least one threshold for the software application has been reached, the at least one threshold associated with a set cost of executing the software application on the at least one of the plurality of computing resources.

In other aspects a system is provided for managing a plurality of computing resources associated with a first hosting provider to detect or respond to security threats. The system includes a software application executing on a first set of computing resources including at least one of the plurality of computing resources, the software application accessible by a plurality of users via a network by a plurality of user devices. A data metric is associated with the software application, the data metric is indicative of a computing load placed on the at least one of the plurality of computing resources due to the plurality of users accessing said software application. A system computer is in communication with the at least one of said plurality of computing resources. An analysis module is associated with the system computer for analyzing the data metric and to determine a number indicative of how many of the plurality of users are unique users. A notification module generates a notification based on a threshold associated with the resource usage value having been reached where the threshold is adjusted based on the number.

The notification may block usage of one or more of the plurality of computing resources by one or more of those of the plurality of users that are not unique. The notification may be transmitted to the one or more of the plurality of computing resources. The system may also include a security module generating a report indicative of a resource usage value associated with those of the plurality of users that are not unique users.

DETAILED DESCRIPTION OF THE INVENTION

Figure 1:
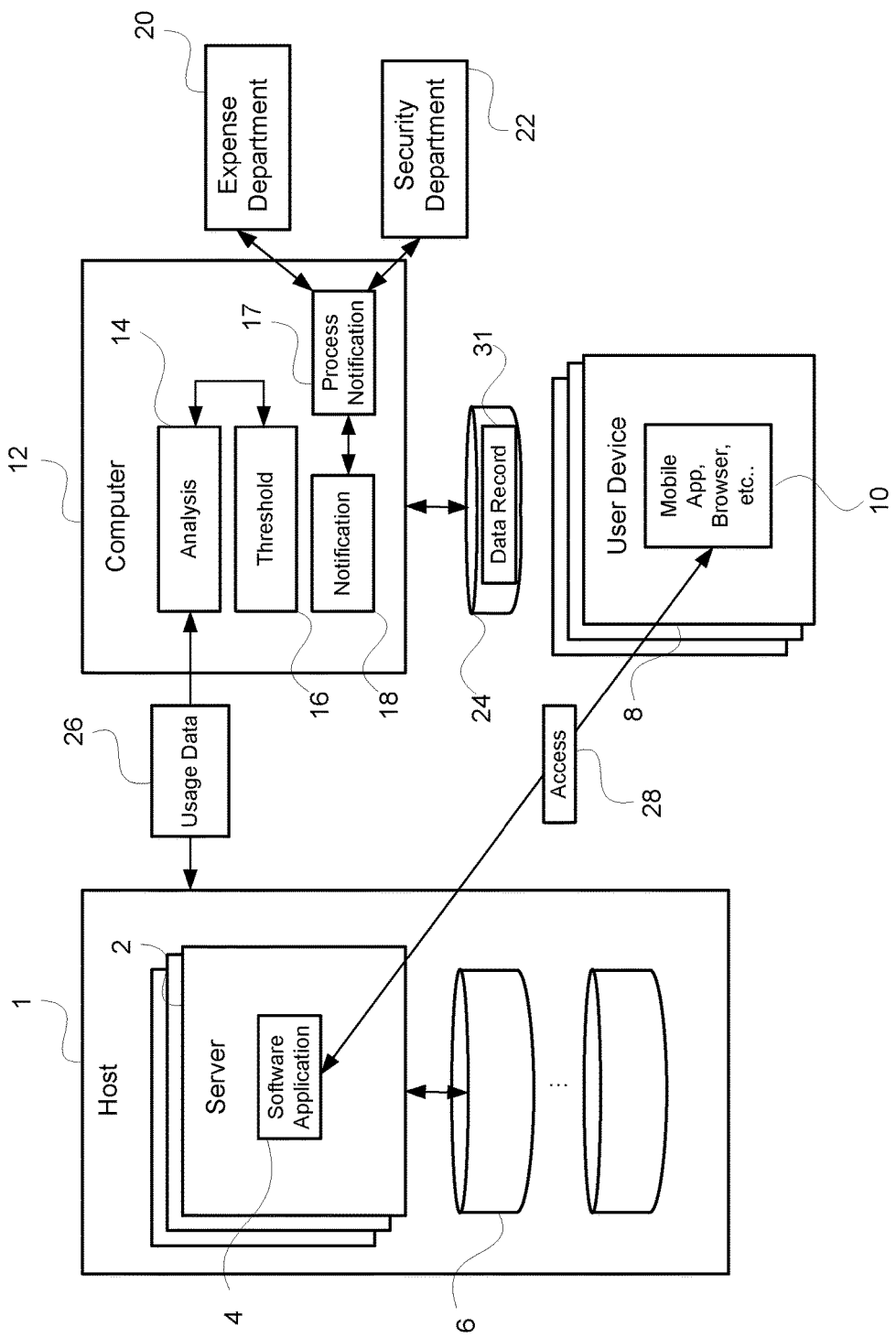
FIG. 1 is a functional flow diagram according to the present invention.

Referring to FIG. 1, a host 1 is shown providing computing resources such a number of servers and databases. Software application 4 is shown executing on server 2. Storage 6 is further in communication with the server 2. It is understood that various types of servers and storages can be provided by the host 1, and the software application 4 can execute or otherwise use a number of different computing resources to function. For example, the storages can be solid state drives that provide low access time and thus high performance. The data stored on these low access time storages may be accessed more frequently in carrying out the various functions of the software application 4. High access time storages may also be used for disaster recovery or archival storage. Typically, data stored on these types of storages would be needed less frequently by the software application.

The servers or computers may also have different performance characteristics and computing capabilities and may be used for different functions.

User devices access the software application via an interface 10. For example user device 8 may be a mobile phone, tablet, laptop or desktop computer. The interface 10 may be a mobile a mobile app, web browser/web interface or other feature that allows the user device 8 to access 28 the software application 4 on the server 2. This access 28 transmits data and requests back and forth between the software application 4 and the user device 8. The data transmitted between the user device 8 and the host 1 may include additional identification information. For example, the data exchanged may enable the host 1 to identify IP addresses, device identifiers, browser versions, operating systems and other data that can be used to determine if users are unique or not. It is also contemplated that the user device may simply be a non-human user device that uses M2M (Machine to Machine) communication to perform various functions. In this case, the user may simply be the machine itself.

The access 28 causes the server perform various computing functions and these computing functions cause the computing resources of the host 1 that are associated with the software application 4 to use computing power, which in turn allows the computer 12 to retrieve usage data 26 from the host 1. This usage data may be gathered by a software routine that is installed on the host 1 computing resources due to the software application 4 being installed on these computing resources. In other cases, the host 1 may provide an API or other data exchange that allows the computer 12 to access the usage data 26. In some aspects, the usage data 26 includes metric(s) that are indicative of the computing load placed on the computing resources associated with the software application 4 due to the software application 4. The usage data may also include data that enables the host 1 to identify IP addresses, device identifiers, browser versions, operating systems and other data that can be used to determine if users are unique or not.

The analysis module 14 of the computer 12 is capable of determining a number of things. In one aspect, the analysis module measures a data metric via the usage data 26. This data metric is associated with the software application. In one aspect, the data metric allows the computer to determine how much computing power/resources are being used by the software application due to the access 28 by the users. The data metric may also be used to determine how much computing power/resources are reserved by the software application. By further comparing usage to the reserved power/resources, it can be determined if there is an over reservation of computing power/resources. For example, the software application may be associated with too many servers such that the owner of the software application is paying the host 1 for server reservation that is not needed.

The threshold module 16 of the computer 12 is used to monitor the software application. As an example, if the costs, changes in cost and/or computing power used/reserved by the software application increases beyond a threshold value, a notification 18 is generated. This notification 18 is processed 17 and may be sent to the expense department 20 or security department 22 associated with the software application this notification can then be used to determine if changes should be made to the software application to alleviate some of the hosting cost.

The threshold may also be variable to account for desired and undesired usage of the software application and the computing resources of the host. If there is a large amount of publicity for a particular software application, an increase of users would be expected. For example, if a product is featured on a popular television show, the website selling the product may receive many additional users in a short time span. This sharp increase in usage would cause a sharp increase in computing power/resources used which would in turn increase the cost of hosting the software application (website). This increase may cause the threshold to be reached very quickly and therefore, the threshold would be adjusted to account for this increase in desired usage. In some cases, usage (traffic) of the software application (website) is due to an attack that causes increased computing resource usage but does not provide added desired usage of the software application. The undesired usage would need to be ignored from the factors that cause adjustment to the threshold, because this usage is the type that it is desirable to avoid.

As one example of an attack, a Denial of Service (DOS) attack attempts to flood or crash a server or application by repeatedly accessing the server so that the server or application is not capable of handling the amount of usage. There are many types of attacks that can shut down or slow down an application, or the attack could simply cause a large increase in usage and therefore cost. However, these attacks commonly originate from a single machine or use a common request or pattern of requests to repeatedly access the server/software application. The prime difference between valid usage and invalid usage is that valid usage is associated with unique users whereas invalid usage originates from the same or a small number of users. Therefore, when users are unique, the threshold may be adjustable to account for increases in unique users, but if there is a large growth in non-unique users, the threshold may not be adjustable and therefore the notification would be generated.

To determine if users are unique, the requests to the software application via the access 28 may be looked at. This is especially relevant in a Distributed Denial of Service (DDOS). A DDOS attack is very similar to a DOS attack, but the IP addresses of the users are faked or generated in a way that the users/requests appear to be coming from different users. In this case, the requests would be the same or would occur in a pattern or there would be some unifying characteristic to the requests. Based on the requests being non-unique, each time the request (or request in the pattern) is repeated, that request would be considered to be associated with a non-unique user even though it may be impossible to determine or identify the actual user.

In some cases, other types of attacks are set up to fill up processing or memory intensive functions with non-genuine tasks. For example, a shopping cart requires a number of server and memory functions to function properly and this results in computing resource usage such as CPU, memory and others. Some attacks very rapidly fill up numerous unique shopping carts and crash the system to thereby prevent unique users (real customers) from adding items to their shopping carts and checking out. To deal with this, some sites have a timeout function, so that carts that sit idle for a while are deleted. But in some cases, it is possible to detect patterns of usage that are not typical of a human user. For example, if new items are rapidly added to the shopping cart, at a speed faster than a human would be expected to be able to add items, this may flag certain users. Other examples are contemplated, depending on the particular software application that is being used. The system is tracks usage patterns based on thresholds that allow the system to determine when a user is not unique and potentially malicious.

Hosting costs vary widely depending on usage and how hosting providers charge for usage in different ways. This results in many opportunities for there to be unexpected costs or bill-shock. Since each application has different computing needs and each application will react differently depending on how the application is used, it is very difficult to accurately predict or even monitor costs. By capturing usage of hosted resources, including usership, malicious attacks, activation/deactivation of resources and updates to software applications, thresholds can be applied to capture anomalies in usage and enable administrators to proactively deal with the usage when appropriate.

Figure 2:
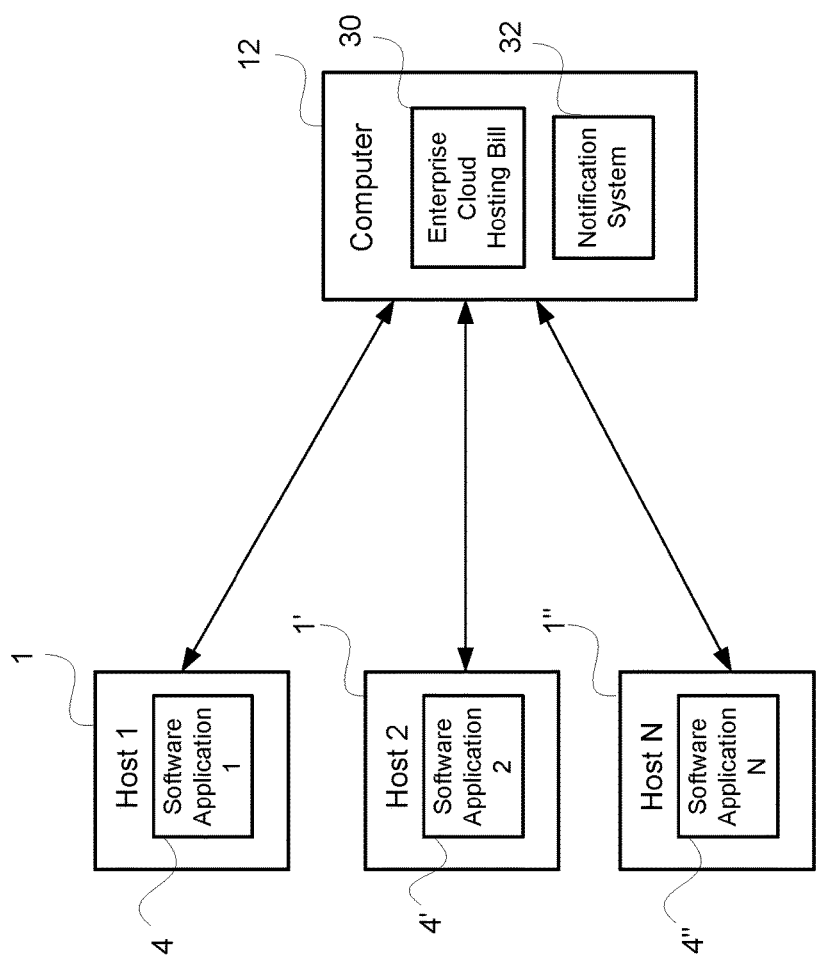
FIG. 2 is a functional flow diagram according to one aspect of FIG. 1.

Referring to FIG. 2, one aspect of the resource usage system is shown where the computer 12 is in communication with Hosts 1, 1' and 1". The computer 12 determines the enterprise cloud hosting bill 30 based on usage data received from the hosts. In some aspects, the hosting bill consolidates all data from the hosts 1, 1' 1" relating to usage so that the overall enterprise billing and usage can be determined. This allows for the system to both alert based on individual anomalies in individual host usage, but based on aggregated usage. For example, the threshold for each host individually may allow for a variance of 10% above expected usage to avoid issuing too many alerts. But, if ever all host resources increase by 5%, this may not cause a notification or alert to be issued for individual hosts, but in the aggregate, expenses that are 5% over budget may require an alert. This allows for the system administrators to set thresholds of multiple levels that account for both individual host (or instance/server) usage as well as aggregate usage across all (or multiple) hosts.

Figure 3:
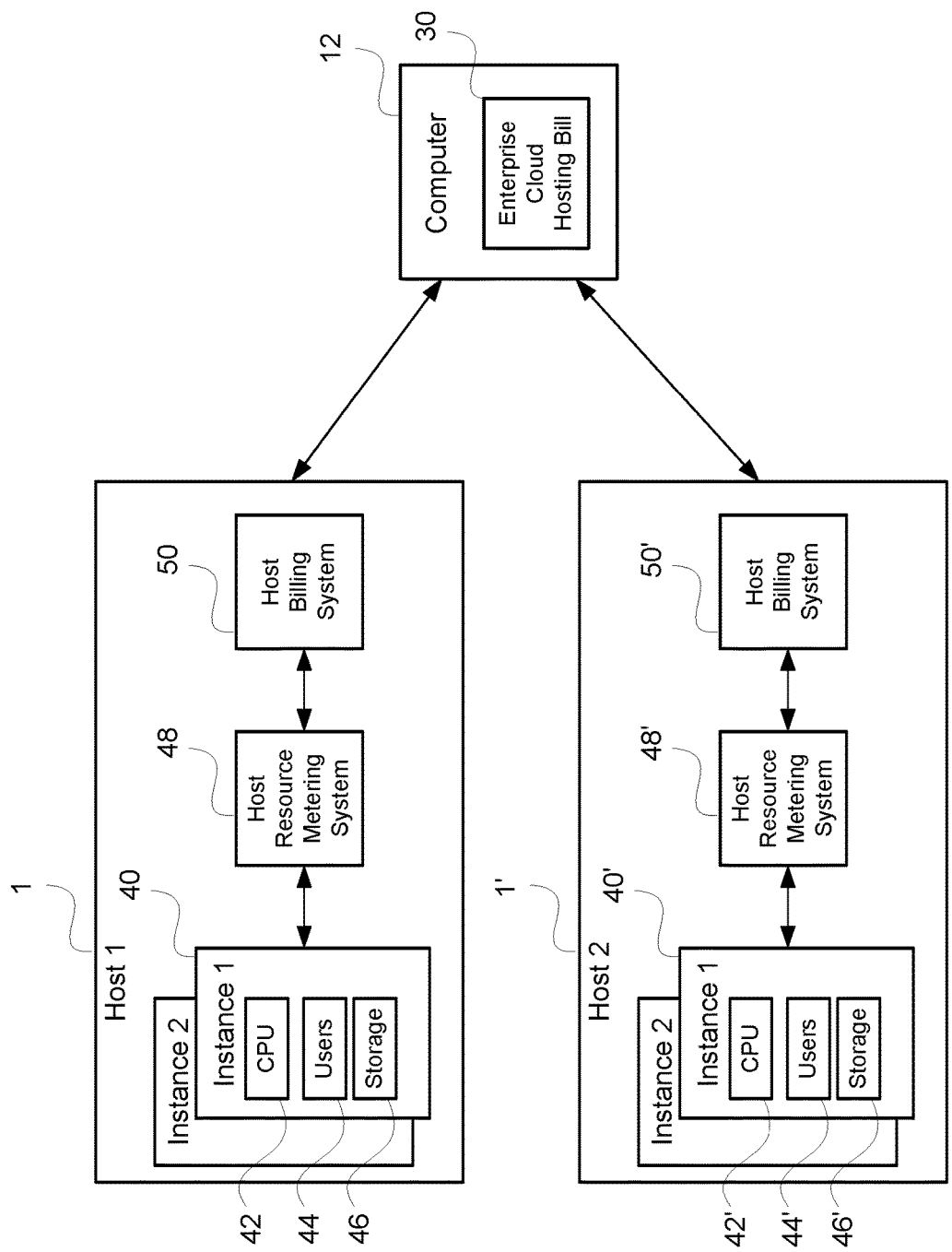
FIG. 3 is a functional flow diagram according to another aspect of FIG. 1.

Referring now to FIG. 3, hosts 1 and 1" are shown with CPU 42/42' Users 44/44' and Storage 46/46' causing usage on the instance 40/40'. It is understood that other parameters can result in resource usage that is charged by the host. Some other exemplary parameters are shown and described with regards to FIG. 6. Host resource metering system 48 is in communication with all relevant instances and based on a billing model, the host billing system 50 determines a charge for the hosted services. Host 1' includes similar features. The hosts 1, 1' are in communication with computer 12 and the enterprise cloud hosting billing system 30. This billing system 30 allows for aggregation and comparison between multiple hosts and further enables host specific or more general alerts.

Figure 4:
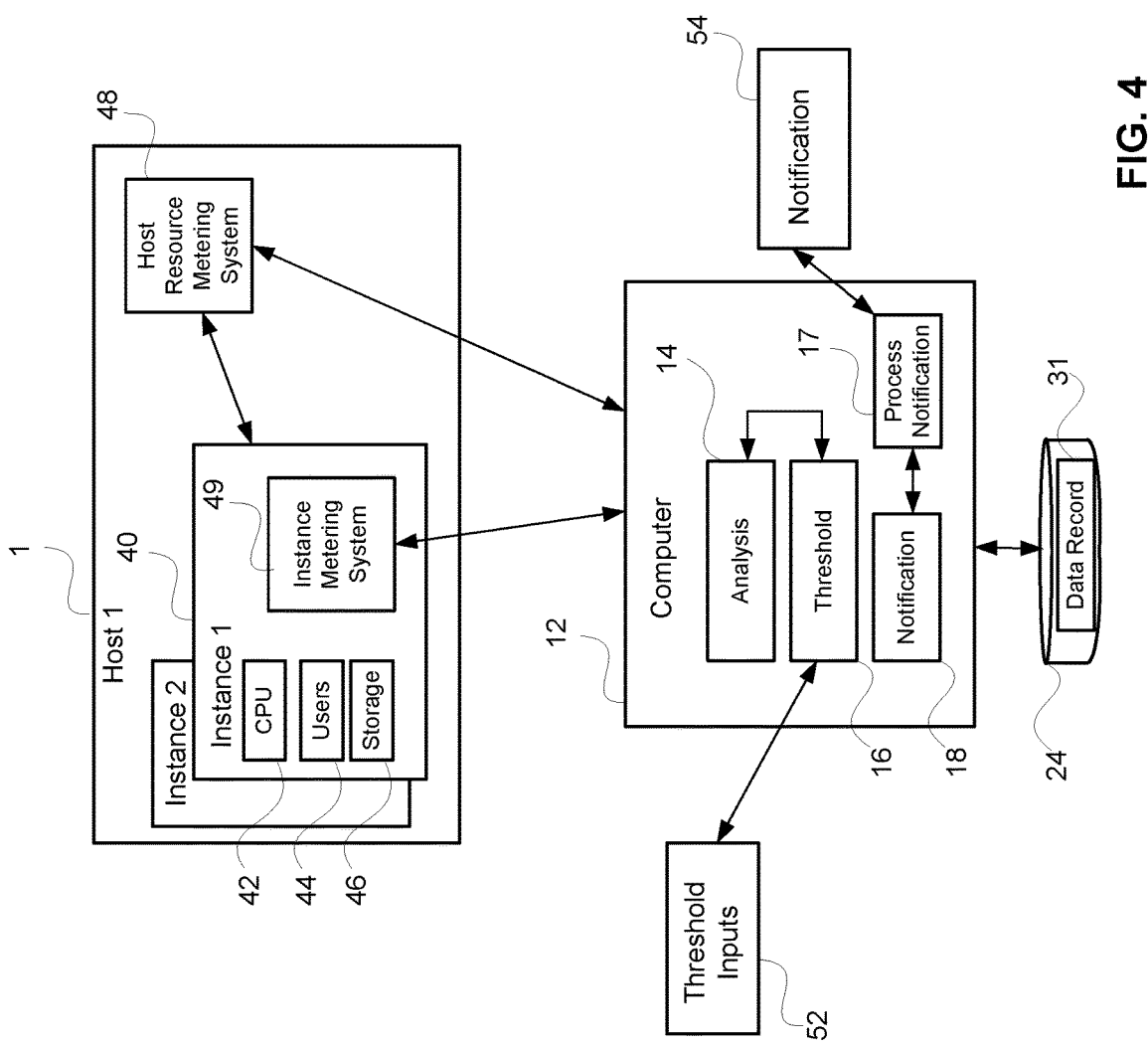
FIG. 4 is a functional flow diagram according to yet another aspect of FIG. 1.

FIG. 4 shows one aspect where a specific metering system is provided on the instance. This instance metering system 49 may be a piece of software/code that is included in the software application 4 and installed directly on the instance 40 to enable communication with the computer 12. In some aspects, the host 1 provides a resource metering system 48 that enables communication with the computer 12. This allows the computer to receive usage data in order to carry out the analysis and notification functions. As shown, threshold inputs 52 can modify the set thresholds based on administrator preferences. When the usage data indicates that the threshold is reached, notification 54 is transmitted to the administrator or other individual selected to receive the notification 54. The notification may be (for example) an e-mail, text message, or simply a notification on a web or mobile portal. The notification may also deactivate instances or features of the software application.

Figure 5:
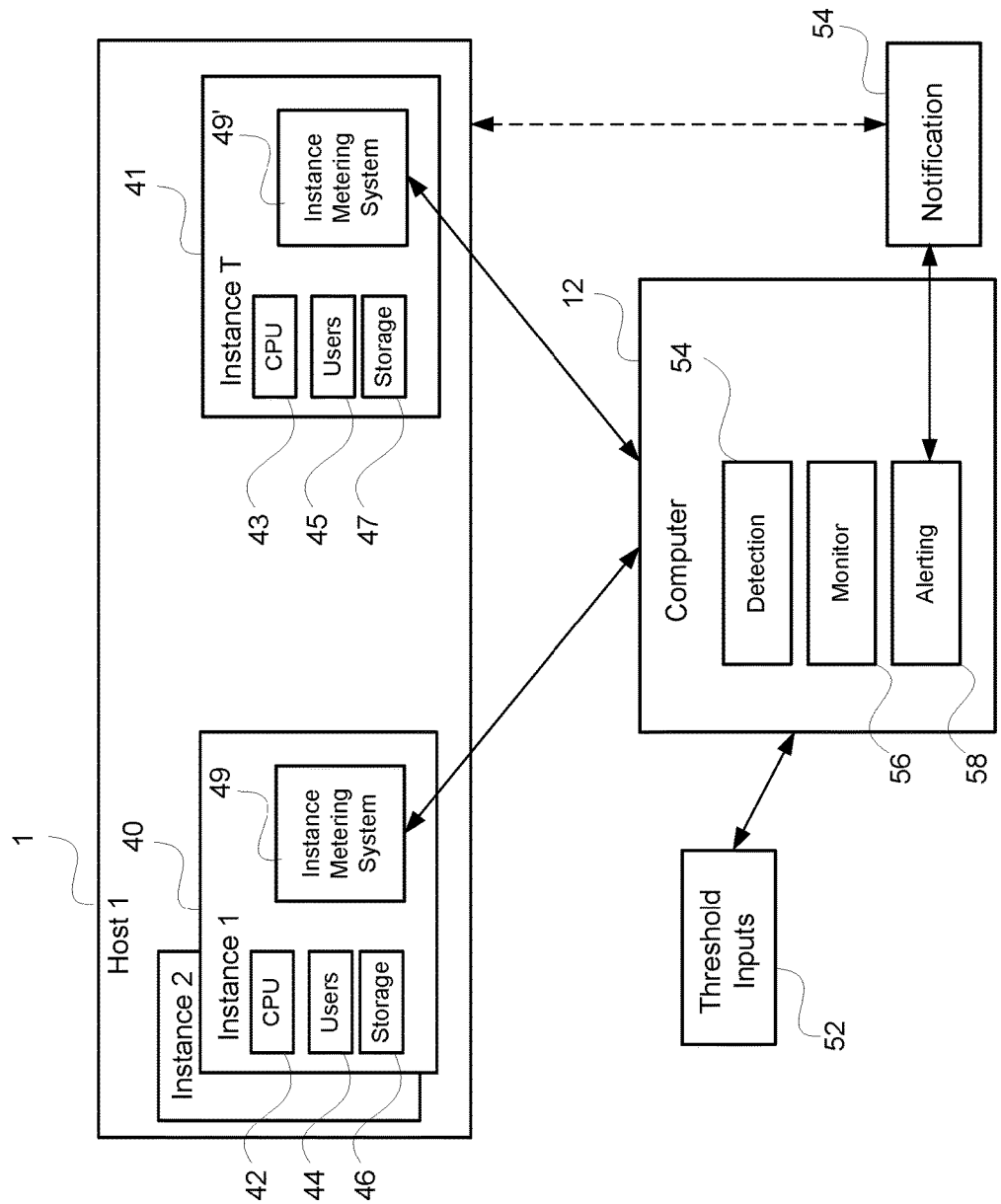
FIG. 5 is a functional flow diagram according to another aspect of FIGS. 1 and 4.

FIG. 5 shows another aspect where a temporary instance 41 is activated. Because of the ability to quickly activate and de-activate instances to perform calculations, usage of hosted resources may be difficult to determine based on software applications alone. Temporary instances 41 may be activated automatically to accommodate unusually high traffic or usage or may simply be activated by developers or other individuals in order to perform a variety of tasks. The computer 12 therefore includes features within the threshold and analysis modules that allow for detection 54 of these temporary instances 41 and monitoring 56 of the resource usage associated with these temporary instances 41. These temporary instances 41 may also have a spot bidding/auction billing model available.

The system in comparing the billing model to the usage may also suggest to the user activating the temporary instance 41 that this bidding model is available and that if the computing routine can be done at a later time, there are potential savings. In doing so, the system may compare projected usage and computing needs to the billing model and spot bid/auction opportunities and then suggest that if the routine can be completed at a later time i.e. "sometime before tomorrow morning at 9 am" (as but one example of a time period) that the auction opportunity is the better solution based on the resources needed and the time sensitivity of the particular routine.

Figure 6:
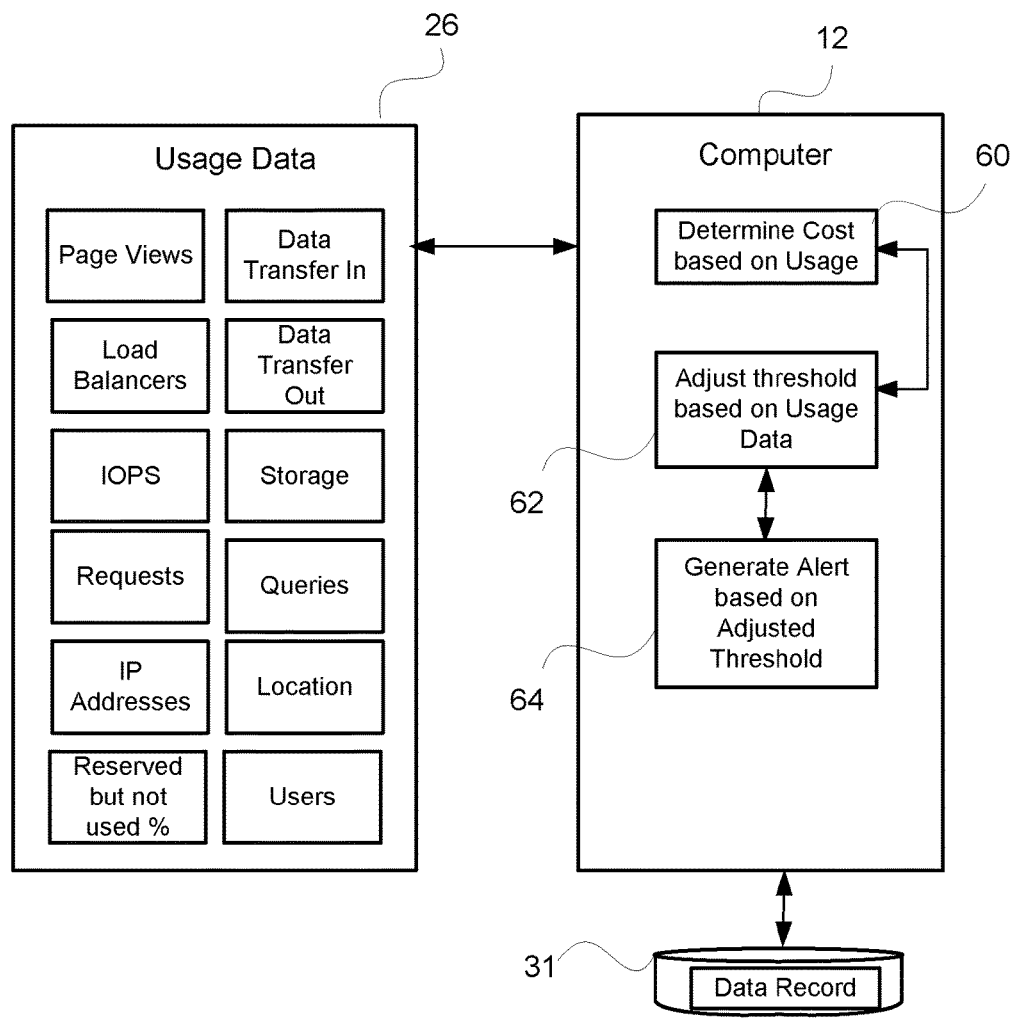
FIG. 6 is a functional flow diagram according to a security monitoring aspect of FIG. 1.

FIG. 6 shows an example of what the usage data 26 includes. For example, Page Views, Data Transfer In, Load Balancers used/reserved, Data Transfer Out, IOPS (Input/Output Operations Per Second), Storage used/reserved, Requests, Queries, IP Addresses reserved, Reserved but not used %, Location and User identifiers can all makeup part of the usage data 26. These data points are can be gathered using the instance metering system 49 or may be gathered via the host resource metering system 48. These metering systems may be accessed via an API that allows the computer 12 and the host 1, 1', 1" etc to communicate. The usage data is compared with billing models to determine cost based on usage 60. The threshold may be adjusted based on usage 62. For example, if a large number of unique users begin to access the software application, it may be desirable to issue notifications, but the notification may not shut down or limit access to the software application. In the example where there are many non-unique users, the computer 12 can be configured to issue the notification to the host to stop access to the software application either for all users or for selected users.

Some host providers charge for reserving a certain amount of server power/space and also charge based on the amount of usage of that server power/space. As users increase, so does the required processing power/storage space and therefore the cost likewise increases.

The analysis module further can determine from the usage data if additional resources become associated with the software application 4. This may be accomplished by the detection module 54. For example, if the software application is associated with a set of computing resources based on a reservation of 2 servers and 100 GB of storage, the host may charge a certain dollar value based on what types of servers and storages are reserved. More powerful servers would typically be more expensive than the less powerful ones. If this software application is later switched to different servers (i.e. more or less powerful) or an additional server is added or servers are removed, the software application 4 would then be associated with a different set of computing resources and different charges. This different set may be overlapping to the original set in that there may be common resources between the two sets, or the two sets may be completely different. In any event, the change of the reserved/used computing resources may carry with it a different price. Temporary instances 41 may also be activated. The analysis module can further access a data record that is indicative of a billing model or pricing structure of the host so that the cost or change in cost can be determined based on the change in which computing resources are used/reserved by the software application. It is understood that each instance described herein may be activated on a single or on multiple servers and that the instance may also be considered a server or may be a virtual machine.

Although the threshold adjusts in some cases, it is still understood that the changing of the threshold may itself cause a notification to be generated.

Thresholds may also be associated with the number of non-unique users. As an example, there may be a baseline acceptable number or percentage of non-unique users that is considered acceptable. But, if this value or percentage of unique users increases rapidly, this could indicate that an attack is occurring. In such a case, the threshold associated with the non-unique users would be reached and the notification generated.

The notification may simply be an e-mail, text message or other visual/audible alert that is sent to the security/expense department. In some cases, the notification is used to turn off access to the servers or the software application, for example, when there is an attack.

In order to determine the cost of hosting the software application 4, a data record 31 can be accessed. This data record 31 may be associated with a billing model of the host 1. Although shown on storage 24, the data record 31 may be accessed from a storage of the host 1. The usage data is compared to the billing model of the data record and a cost is determined. This cost may be used to determine when thresholds are reached for the software application. Some billing models of the hosts may offer discounts if servers/storage etc. are pre-paid. Since the system has already determined the computing needs of a particular application and is able to estimate expansion of these needs, the opportunity to pre-pay for servers/storage etc. may be factored into the evaluation of a particular host. The system therefore allows the user to understand how pre-pay discounts in comparison to actual usage or expected usage can impact the cost of hosting the software application.

Further, when looking at usage of the various metrics measured over time as the application evolves with real world mix of users and software updates, one can project future expansion and apply this to the current billing models and/or performance to further evaluate cost/performance and best fit thus providing notice when it may be beneficial to consider a move to a provider with a different and more appropriate billing model or performance.

Further when doing such expansion, it may also be appropriate to model the application topology on one or more systems to look for the ultimate fit. For example, an application on multiple hosts v.s. on a single host with more compute power may fit into the service providers billing models more economically thus providing a useful tool with which to map out ones expansion plans.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A system for managing a plurality of computing resources associated with a first hosting provider by monitoring changes in computing resource usage comprising:
   a software application executing on a first set of computing resources including at least one of the plurality of computing resources, said software application accessible via a network by a user device and associated with at least a first metric indicative of a computing load on the first set of computing resources due to said software application executing on the first set of computing resources;
   a system computer in communication with said software application;
   an analysis module associated with said system computer and detecting an association of said software application with a second set of computing resources, the second set of computing resources being those of the plurality of computing resources that the software application executes on due to said association;
   a threshold module in communication with said analysis module and associating at least one threshold with said software application, a first one of the at least one threshold relating to a cost of executing said software application on one or more computing resources;
   said threshold module further determining if the first one of the at least one threshold has been reached based on a second metric indicative of a computing load on the second set of computing resources due to said software application executing on the second set of computing resources;
   a notification module in communication with said threshold module and generating a notification indicative of the first one of the least one threshold has been reached.

2. The system of claim 1 wherein the threshold is reached based on an amount of change between the first and second metrics.

3. The system of claim 1 wherein the second set of computing resources includes the first set of computing resources.

4. The system of claim 1 wherein the second set of computing resources includes fewer computing resources than the first set of computing resources.

5. The system of claim 1 wherein said association is due to an updated version of said software application being associated with the second set of computing resources.

6. The system of claim 1 wherein said threshold is adjusted based on how many unique users of a plurality of users access the software application.

7. The system of claim 1 wherein said threshold is adjusted based on how many unique Internet Protocol (IP) addresses are associated with access to the software application.

8. The system of claim 1 wherein said threshold is adjusted based on how many unique requests are associated with access to the software application.

9. The system of claim 1 wherein said second set of computing resources include at least some of the same computing resources as the first set of computing resources.

10. A system for managing server usage comprising:
a software application executing on at least one of a plurality of computing resources associated with a first hosting provider, the software application accessible via a network by a user device;
a computer in communication with the at least one of said plurality of computing resources;
a storage in communication with the computer and containing a data record indicative of a cost associated with usage of the at least one of said plurality of computing resources;
an analysis module associated with the computer and determining a data metric associated with the at least one of said plurality of computing resources, the data metric indicative of an amount of computing power associated with the software application;
a threshold module associated with the computer and determining when at least one threshold for said software application has been reached, the at least one threshold associated with a set cost of executing said software application on the at least one of said plurality of computing resources.

11. The system of claim 10 wherein the data record is indicative of a billing model associated with the first hosting provider.

12. The system of claim 10 wherein said threshold is adjusted based on how many unique users of the plurality of users access the software application.

13. The system of claim 10 wherein said threshold is adjusted based on how many unique Internet Protocol (IP) addresses are associated with access to the software application.

14. The system of claim 10 wherein said threshold is adjusted based on how many unique requests are associated with access to the software application.

15. The system of claim 10 wherein said threshold is reached when the data metric can be handled by fewer of the plurality of computing resources.

16. The system of claim 15 further comprising an notification module generating an notification based on said threshold having been reached and further indicative of a suggested change to the plurality of computing resources based on which of the plurality of computing resources can handle a computing resource usage associated with the data metric.

17. A system for managing a plurality of computing resources associated with a first hosting provider to detect or respond to security threats comprising:
a software application executing on a first set of computing resources including at least one of said plurality of computing resources, said software application accessible by a plurality of users via a network by a plurality of user devices;
a data metric associated with said software application, said data metric indicative of a computing load placed on said at least one of the plurality of computing resources due to said plurality of user devices accessing said software application;
a system computer in communication with said at least one of said plurality of computing resources;
an analysis module associated with said system computer for analyzing said data metric and determining a number indicative of how many of said plurality of users are unique users;
a notification module generating a notification based on a threshold associated with a resource usage value having been reached wherein the threshold is adjusted based on the number, the resource usage value indicative of usage of said at least one of the plurality of computing resources and a cost associated therewith.

18. The system of claim 17 wherein said notification blocks usage of one or more of said plurality of computing resources by one or more of those of said plurality of users that are not unique.

19. The system of claim 17 wherein said notification is transmitted to said one or more of said plurality of computing resources.

20. The system of claim 17 further comprising:
a security module generating a report indicative of a resource usage value associated with those of said plurality of users that are not unique users.

* * * * *